United States Patent
Bogantz et al.

(10) Patent No.: US 6,243,715 B1
(45) Date of Patent: Jun. 5, 2001

(54) REPLICATED DATABASE SYNCHRONIZATION METHOD WHEREBY PRIMARY DATABASE IS SELECTED QUERIES TO SECONDARY DATABASES ARE REFERRED TO PRIMARY DATABASE, PRIMARY DATABASE IS UPDATED, THEN SECONDARY DATABASES ARE UPDATED

(75) Inventors: Robert L. Bogantz, Columbus; Sidney D. Hester, Pickerington; William W. Kean, Pataskala, all of OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/188,493

(22) Filed: Nov. 9, 1998

(51) Int. Cl.$^7$ ..................................................... G06F 12/00
(52) U.S. Cl. ............................... 707/201; 707/8; 707/10; 707/202; 707/204
(58) Field of Search ................................ 707/8, 10, 201, 707/202, 204

(56) References Cited

U.S. PATENT DOCUMENTS

| | | | |
|---|---|---|---|
| 4,648,036 | * 3/1987 | Galiant | 707/203 |
| 5,212,788 | 5/1993 | Lomet et al. | 395/600 |
| 5,371,886 | 12/1994 | Britton et al. | 395/600 |
| 5,428,771 | 6/1995 | Daniels et al. | 395/575 |
| 5,546,582 | 8/1996 | Brockmeyer et al. | 395/650 |
| 5,657,440 | 8/1997 | Micka et al. | 395/182.14 |
| 5,689,706 | 11/1997 | Rao et al. | 395/617 |
| 5,758,342 | * 5/1998 | Gregerson | 707/10 |
| 5,781,910 | * 6/1998 | Gostanian et al. | 707/201 |

(List continued on next page.)

OTHER PUBLICATIONS

Chundi, P. et al. "Deferred Updates and Data Placement in Distributed Databases", Proceedings of the 12th International Conference on Data Engineering, 1996, pp. 469–476.*

Goldring, R. "A Discussion of Relational Database Replication Technology", InfoDB, vol. 8, No. 1, Spring 1994, pp. 2–12.*

(List continued on next page.)

Primary Examiner—Jean R. Homere
Assistant Examiner—Luke S Wassum
(74) Attorney, Agent, or Firm—King and Schickli PLLC

(57) ABSTRACT

A database system comprises a plurality of replicated databases and a database provisioning system such that when a record needs to be updated, the database provisioning system selects one of the replicated databases as a selected database with the remaining databases being non-selected databases. The provisioning system transmits to each non-selected database update data for updating the record and pointer data that identifies the selected database. The update data is placed in a memory queue in each non-selected database while the pointer data is written into a pointer field in the record being updated in each non-selected database. The non-selected databases then each transmit a ready-to-commit acknowledgment to the provisioning system. The provisioning system then transmits the update data to the selected database. The pointer field of the record being updated in the selected database is reset indicating that the selected database has been selected. The selected database updates the record with the update data and sends a commit acknowledgment to the provisioning system confirming update. The provisioning system then instructs the non-selected databases to update the record with the update data and to clear the pointer field.

18 Claims, 2 Drawing Sheets

U.S. PATENT DOCUMENTS

| | | | |
|---|---|---|---|
| 5,897,641 | * | 4/1999 | Ruddy et al. .......................... 707/202 |
| 5,913,160 | * | 6/1999 | Leung ................................... 455/403 |
| 5,924,096 | * | 7/1999 | Draper et al. ........................... 707/10 |
| 5,999,931 | * | 12/1999 | Breitbart et al. ....................... 707/10 |
| 6,012,059 | * | 1/2000 | Neimat et al. ........................... 707/8 |
| 6,014,667 | * | 1/2000 | Jenkins et al. ......................... 707/10 |
| 6,014,669 | * | 1/2000 | Slaughter et al. ..................... 707/10 |
| 6,018,745 | * | 1/2000 | Kuftedjian ........................... 707/200 |
| 6,073,141 | * | 6/2000 | Salazar ................................ 707/204 |

OTHER PUBLICATIONS

Bernstein, P., V. Hadzilacos, and N. Goodman. "Concurrency Control and Recovery in Database Systems", Addison–Wesley, 1997, ISBN 0–201–10715–5, Chapter 8: Replicated Data. http://sunsite.ust.hk/dblp/db/books/dbtext/bernstein87.html.*

Carey, M., and W. Muhanna. "The Performance of Multiversion Concurrency Control Algorithms", ACM Transactions on Computer Systems, vol. 4, No. 4, Nov. 1986, pp. 338–378.*

Davidson, S., H. Garcia–Molina, and D. Skeen. "Consistency in Partitioned Networks", ACM Computing Surveys, vol. 17, No. 3, Sep. 1985, pp. 341–370.*

Chu, W., and J. Hellerstein. "The Exclusive–Writer Approach to Updating Replicated Files in Distributed Processing Systems", IEEE Transactions on Computers, vol. C–34, No. 6, Jun. 1985, pp. 489–500.*

Bayer, R., H. Heller, and A. Reiser. "Parallelism and Recovery in Database Systems", ACM Transactions on Database Systems, vol. 5, No. 2, Jun. 1980, pp. 139–156.*

* cited by examiner

10

REPLICATED DATABASE SYNCHRONIZATION METHOD WHEREBY PRIMARY DATABASE IS SELECTED QUERIES TO SECONDARY DATABASES ARE REFERRED TO PRIMARY DATABASE, PRIMARY DATABASE IS UPDATED, THEN SECONDARY DATABASES ARE UPDATED

BACKGROUND OF THE INVENTION

The present invention relates in general to replicated database systems, and, more particularly, to a system and method for updating the records in such replicated database systems.

As the name implies, a replicated database system is a database system that comprises a plurality of databases each having an identical set of records. Replicated databases improve reliability as each database generally includes the exact data as the other databases. Processing time is also improved as each of the databases may be accessed simultaneously by different users. Database operations themselves are transparent to the user as any of the databases may supply the desired data. Further, if any one database should fail, there are a number of other databases available to perform the identical function of the failed database.

There are three main principles that should be considered in all replicated database systems. The first principle, atomic transaction processing across multiple database sites, requires that a sequence of database operations be performed in its entirety or not at all. The second principle, database synchronicity, requires that database users have a consistent view of the data independent of which of the replicated databases may be accessed. The third principle, disaster avoidance, requires that the same transaction is never sent to all of the databases simultaneously. Accordingly, any replicated database system must address these three principles.

Referring now to FIG. 1, a typical database system 10 is illustrated. The database system 10 comprises a plurality of replicated databases 11–13, a database provisioning system 14 and a database querying system 16. The database provisioning system 14 is configured to assure that the data in the replicated databases 11–13 is accurate and accessible. The database provisioning system 14 is also configured to update the records in each of the replicated databases 11–13 as needed by performing write operations primarily to respective records. The update operation must be accurate so that the records in all of the replicated databases 11–13 are consistent with each other.

The database querying system 16 is configured to retrieve specific records from the databases 11–13 as requested by one of a number of database users 18 accessing the database system 10. The actual database accessed by the database querying system 16 is transparent to the database user because the database querying system 16 determines the replicated database to which it sends the data request/query. As with most replicated database systems, the database querying system 16 may choose a different database for subsequent requests of the same data such that there is a need for database synchronicity.

The Two-Phase Commit (2PC) Protocol is currently used to update records in a number of replicated database systems. However, while this protocol addresses database atomicity, it only partially addresses data synchronicity and does not address disaster avoidance. In the first phase of database provisioning using the 2PC protocol, the database provisioning system 14 sends an update transaction, i.e., update data, to all of the replicated databases 11–13. The databases 11–13 process the transaction by placing the update data in an inactive state. Thus, at this point, the old data is still available for access, but the update data is in an inactive state and thus not available for access. If the database querying system 16 requests data from any of the databases 11–13, the accessed database will return the old data as the update data is in an inactive state and not accessible. Thus, data synchronicity is assured during this phase of processing.

After the update data has been placed in an inactive state, each database transmits a ready-to-commit (RTC) acknowledgment signal to the provisioning system 14 indicating that the database is ready to update the record and complete the transaction in the second phase of provisioning. If all of the replicated databases 11–13 respond with an RTC acknowledgment, the provisioning system 14 will send a commit transaction to all of the databases 11–13 instructing them to update the record with the update data in the third phase of provisioning. After the commit transaction is processed, the update data is available for access while the old data is not as the old data is deleted by the update. If one of the databases 11–13 fails to place the update data in the inactive state, the provisioning system 14 will request that all of the other databases rollback the transaction. That is, the databases delete the update data such that the old data remains accessible. Thus, transaction atomicity is assured by the 2PC protocol.

If the database querying system 16 requests data from any of the databases 11–13 after the commit transaction has been processed, the accessed database will return the new data. However, if the database querying system 16 requests data from any of the databases 11–13 prior to the commit transaction being processed, the accessed database will return the old data. Accordingly, there is a "window" of time in which the data may be inconsistent (i.e., new data is returned in response to a request to a database having performed the commit transaction and then old data is returned in response to a subsequent request to a database which has yet to perform the commit transaction) such that data synchronicity is not assured for the duration of the 2PC protocol. The "window" is caused because the time-to-commit may take several seconds to several minutes. With today's fast processors, several thousand queries can be processed in that time leading to inconsistent views of the data relative to the other queries. Further, as the same transaction is transmitted to all databases simultaneously, the 2PC protocol violates the principle of disaster avoidance since each of the databases could fail if the transaction itself is defective. Thus, the 2PC protocol assures database atomicity, but has a window of uncertainty during processing with regards to data synchronicity, and totally ignores the principle of disaster avoidance.

Accordingly, there is a need for a replicated database system and a method for updating records in such a system that assures data atomicity, data synchronicity and disaster avoidance during all phases of processing. There is another need for a replicated database system in which provisioning of the database does not affect database availability to the user. Preferably, such a system is relatively easy to implement and cost effective.

SUMMARY OF THE INVENTION

The present invention meets these needs by providing a database system comprising a plurality of replicated databases and a database provisioning system herein when a record needs to be updated, the database provisioning system selects one of the replicated databases as a selected database with the remaining databases being non-selected databases. The provisioning system transmits to each non-selected database update data for updating the record and pointer data that identifies the selected database. The update data is placed in a memory queue in each non-selected database while the pointer data is written into a pointer field in the record being updated in each non-selected database. The non-selected databases then each transmit a ready-to-commit acknowledgment to the provisioning system. The provisioning system then transmits the update data to the selected database. The pointer field of the record being updated in the selected database is reset indicating that the database has been selected. The selected database updates the record with the update data and sends a commit acknowledgment to the provisioning system confirming update. The provisioning system then instructs the non-selected databases to update the record with the update data and to clear the pointer field.

According to a first aspect of the present invention, a method for updating at least one record in each of a plurality of replicated databases is provided. One of the plurality of databases is selected as a selected database with the remaining databases being non-selected databases. Update data for updating the record and pointer data identifying the selected database is transmitted to each of the non-selected databases. The update data for updating the record in the selected database is transmitted to the selected database. The record in the selected database is updated with the update data. The non-selected databases are instructed to update the record with the update data. The non-selected databases are also instructed to clear the pointer data.

The method may further comprise the step of receiving a ready-to-commit acknowledgment from each of the non-selected databases indicating receipt of the update data and the pointer data prior to the step of transmitting the update data for updating the record to the selected database. The step of transmitting update data for updating the record and pointer data identifying the selected database to each of the non-selected databases may comprise the step of holding the update data in a queue. Preferably, the queue forms a portion of each of the non-selected databases. The step of transmitting update data for updating the record and pointer data identifying the selected database to each of the non-selected databases may comprise the step of updating a pointer field in each of the plurality of non-selected databases with the pointer data. The step of transmitting the update data to the selected database for updating the record in the selected database may further comprise the step of updating a pointer field in the selected database indicating that the database has been selected. The method may further comprise the step of receiving a commit response from the selected database indicating that the record has been updated prior to the step of instructing the non-selected databases to update the record with the update data. The method may be used to update a plurality of records.

According to another aspect of the present invention, another method for updating at least one record in each of a plurality of replicated databases is provided. One of the plurality of databases is selected as a selected database with the remaining databases being non-selected databases. Update data for updating the record and pointer data identifying the selected database is transmitted to each of the non-selected databases. The update data is held in a queue in each of the non-selected databases. A pointer field in the record is updated with the pointer data in each of the plurality of non-selected databases. Each of the non-selected databases generates a ready-to-commit acknowledgment indicating receipt of the update data and the pointer data. If the ready-to-commit acknowledgment is not generated by each of the non-selected databases within a first predetermined amount of time, then each of the non-selected databases are instructed to delete the update data from each respective queue and to clear the pointer data from each respective pointer field. Otherwise, the update data is transmitted to the selected database for updating the record in the selected database. The record in the selected database is updated with the update data while a pointer field in the selected database indicates that the database has been selected. The selected database generates a commit acknowledgment indicating that the record has been updated. If the commit acknowledgment is not generated by the selected database within a second predetermined time, then each of the non-selected databases are instructed to delete the update data from each respective queue and to clear the pointer data from each respective pointer field. Otherwise, each of the nonselected databases are instructed to update the record with the update data and to clear the pointer data.

According to yet another aspect of the present invention, a database system comprises a plurality of replicated databases and a database provisioning system. Each of the plurality of replicated databases comprise a plurality of records. The provisioning system includes a provisioning system processor configured to control the plurality of replicated databases so as to update at least one record of the plurality of records in each of the plurality of replicated databases, as necessary. The provisioning system processor is programmed to: select one of the plurality of replicated databases as a selected database with the remaining databases being non-selected databases; transmit to each of the non-selected databases update data for updating the record and pointer data identifying the selected database; transmit to the selected database the update data for updating the record in the selected database with the record in the selected database being updated with the update data; instruct the non-selected databases to update the record with the update data and clear the pointer data.

The provisioning system processor may be further programmed to receive a ready-to-commit acknowledgment from each of the non-selected databases indicating receipt of the update data and the pointer data prior to the provisioning system processor transmitting to the selected database the update data for updating the record in the selected database. Each of the plurality of non-selected databases may comprise a memory queue for storing the update data for updating the record. Preferably, each of the plurality of records in each of the plurality of replicated databases includes a pointer field with the processor being programmed to cause each of the non-selected databases to write the pointer data into each respective pointer field.

Preferably, each of the plurality of records in each of the plurality of replicated databases includes a pointer field with the processor being programmed to cause the selected database to indicate in the pointer field of the record being updated that the database has been selected. The pointer field of the record in the selected database is updated by being set to a predefined value, e.g., zero, which indicates that the database has been selected. The provisioning system processor may be further programmed to receive a commit response from the selected database indicating that the at least one record has been updated prior to the provisioning system processor instructing the non-selected databases to update the at least one record with the update data.

According to a further aspect of the present invention, a database system comprises a plurality of replicated databases and a database provisioning system. Each of the plurality of replicated databases comprise a memory queue and a plurality of records each including a pointer field. The database provisioning system includes a provisioning system processor configured to control the plurality of replicated databases so as to update at least one record of the plurality of records in each of the plurality of replicated databases, as necessary. The provisioning system processor is programmed to: select one of the plurality of replicated databases as a selected database with the remaining databases being non-selected databases; transmit to each of the non-selected databases update data for updating the record and pointer data identifying the selected database with the update data being stored in the memory queue in each of the non-selected databases and with the pointer field in the record in each of the non-selected databases being updated with the pointer data; transmit to the selected database the update data to update the record in the selected database with the update data once a ready-to-commit acknowledgment signal is received from each of the non-selected databases in a first predetermined amount of time indicating receipt of the update data and the pointer data. If the ready-to-commit acknowledgment signal is not received from each of the non-selected databases within the first predetermined period of time, then the provisioning system processor is programmed to instruct each of the non-selected databases to delete the update data from each respective memory queue and to clear the pointer data from each respective pointer field. Otherwise, the provisioning system processor is programmed to instruct the non-selected databases to update each respective record with the update data and to clear the pointer data from each respective pointer field once a commit acknowledgment signal is received from the selected database in a second predetermined period of time indicating that the at least one record has been updated in the selected database. If the commit acknowledgment signal is not received from the selected database within the second predetermined period of time, then the provisioning system processor is programmed to instruct each of the non-selected databases to delete the update data from each respective memory queue and to clear the pointer data from each respective pointer field.

Accordingly, it is an object of the present invention to provide a replicated database system and a method for updating records in such a system that assures data atomicity, data synchronicity and disaster avoidance during all phases of processing. It is another object of the present invention to provide a replicated database system in which provisioning of the database does not affect database availability to the user. It is another object of the present invention to provide such a system that is relatively easy to implement and cost effective. Other features and advantages of the invention will be apparent from the following description, the accompanying drawings and the appended claims.

DETAILED DESCRIPTION OF THE PREFERRED EMBODIMENTS

Figure 1:
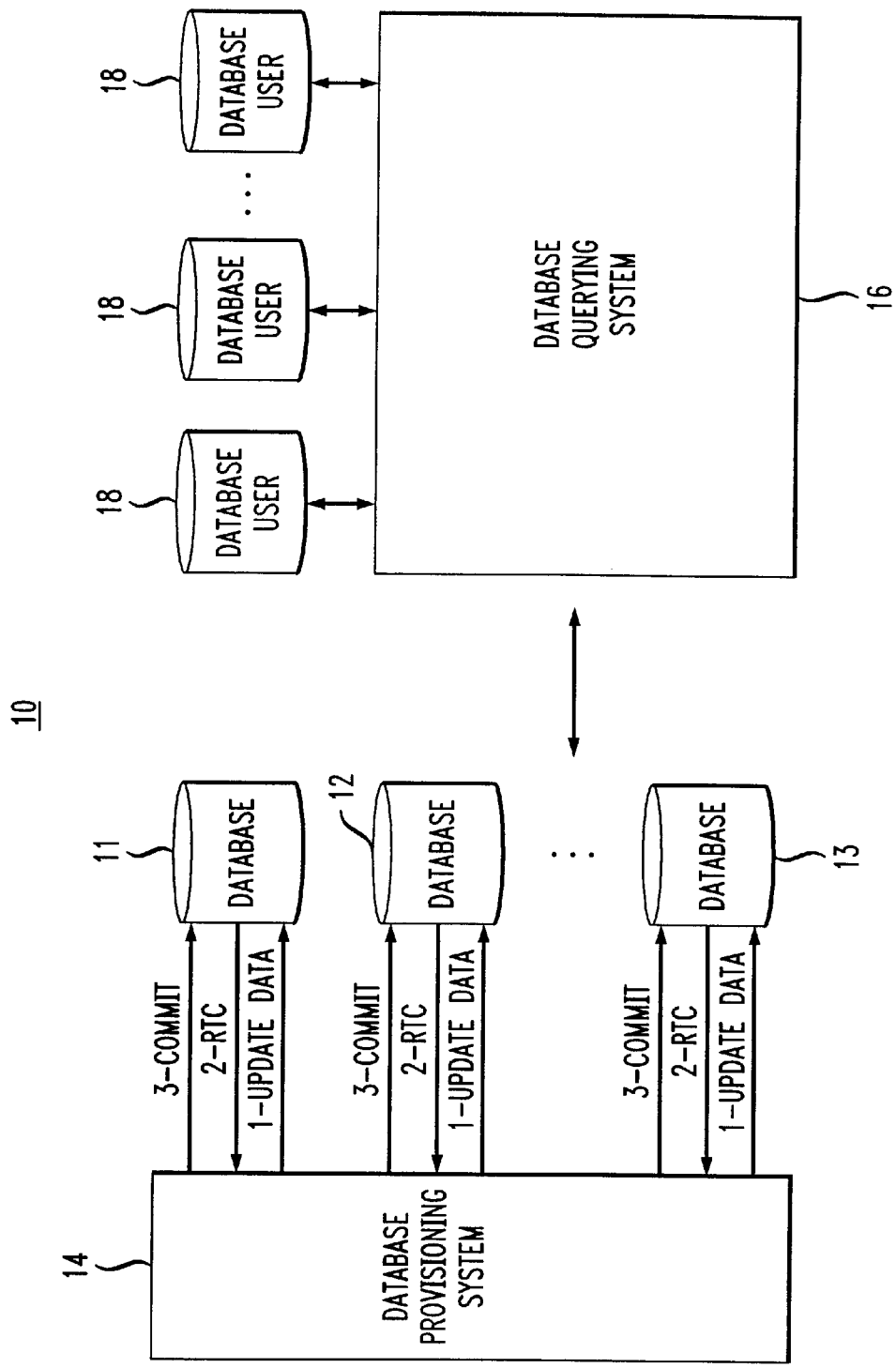
FIG. 1 illustrates a database system according to the background art.
Figure 2:
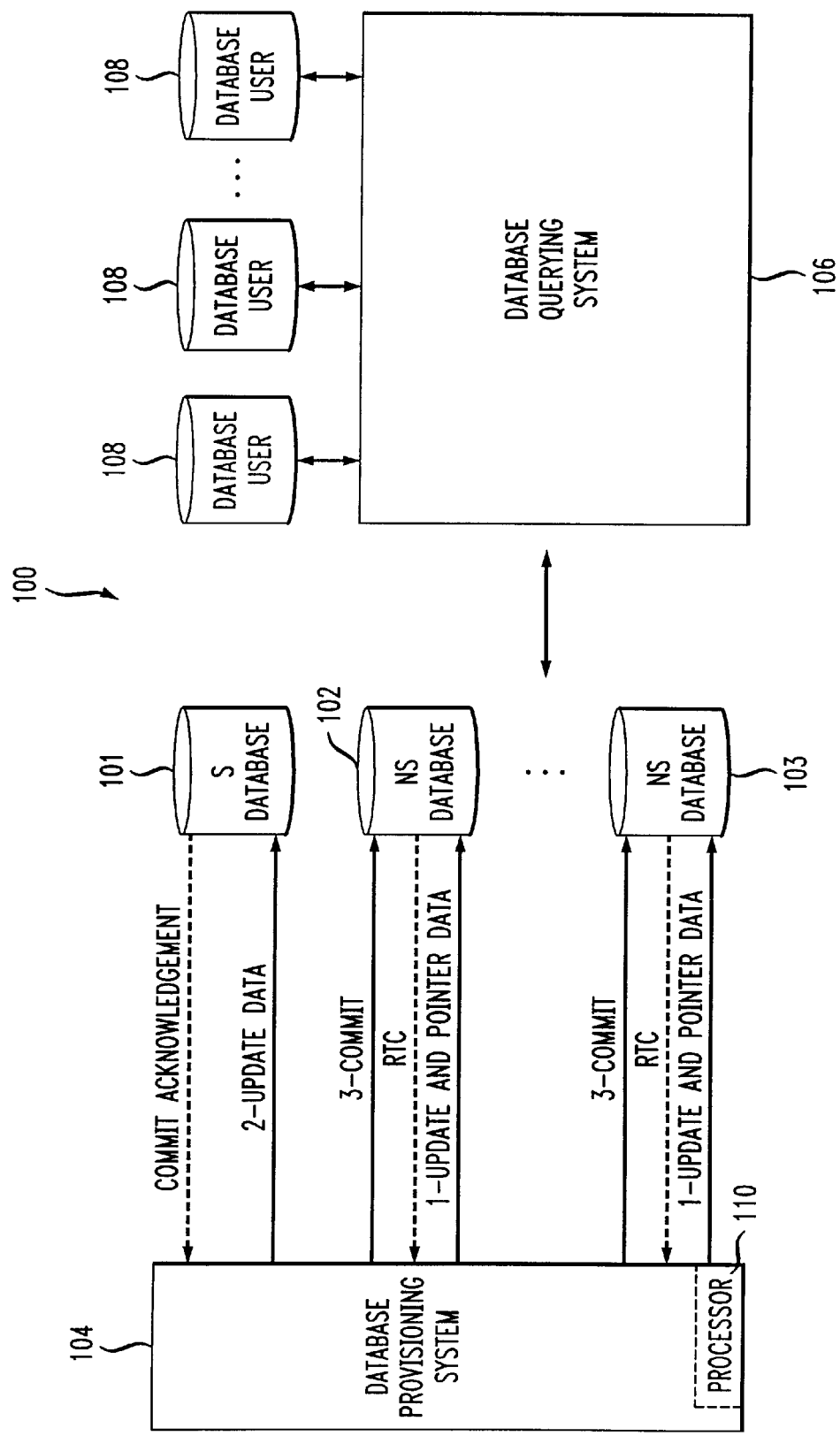
FIG. 2 illustrates a database system according to the present invention.

Referring now to FIG. 2, a database system 100 according to the present invention is illustrated. The database system 100 comprises a plurality of replicated databases 101–103, a database provisioning system 104 and a database querying system 106. Each of the plurality of replicated databases 101–103 includes a plurality of substantially identical records. It will be appreciated by those skilled in the art that one or more of the replicated databases 101–103 may include one or more records that the other databases do not include. Each of the records in each of the databases 101–103 include fields of data. Each record in each of the databases 101–103 includes a pointer field comprising pointer data indicating a selected database as described herein. Each of the databases 101–103 also includes a memory queue. It will be appreciated by those skilled in the art that the number of replicated databases shown in FIG. 2 is illustrative only and that the database system 100 may comprise any reasonable number of replicated databases as appropriate for the particular application for which it is being used.

The database provisioning system 104 is configured to assure that the data in the replicated databases 101–103 is accurate and accessible. The database provisioning system 104 is also configured to update the records in each of the replicated databases 101–103 as needed, primarily by performing write operations to respective records. The update operation must be accurate so that the records in all of the replicated databases 11–13 are consistent with each other. The database provisioning system 104 includes a database provisioning system processor 110 that is programmed to control the process of updating the records in the replicated databases 101–103.

The database querying system 106 is configured to retrieve specific records from the databases 101–103 as requested by one of a number of database users 108 accessing the database system 100. The actual database accessed by the database querying system 106 is transparent to the database user because the database querying system 106 determines the replicated database to which it sends the data request/query. As with most replicated database systems, the database querying system 106 may choose a different database for subsequent requests of the same data, e.g., database 102 accessed first to retrieve a first record with database 101 then being accessed second to retrieve the first record.

A record being updated with update data is called a record in transition. According to the present invention, database synchronization is achieved by having those query messages which access a record in transition routed to a specific database that has already been updated or will be updated. By having those queries that access records in transition redirected and processed by a specific database, data synchronicity (consistency) from the perspective of the database user is assured.

The provisioning system processor 110 is programmed so that when a record in each of the databases 101–103 needs to be updated, the provisioning system 104 selects one of the databases 101–103 as the requery or selected database (SDB). The remaining databases are referred to as non-selected databases (NSDBs). Accordingly, any queries from the querying system 106 that access records that are in the process of being updated are redirected to the selected database. If during query processing by the database queried by the querying system 106, it is determined that the record that the user requested is being updated by the provisioning system 104, the queried database will halt processing of the request and launch a request back to the database querying system 106 to transmit this query to the specified selected database. The requery is completely transparent to the user.

The pointer field in each record is used to indicate that an update is in progress. A non-zero value in the pointer field indicates that an update of the record is in progress. The non-zero value actually corresponds to the index of the current selected database. Accordingly, if the pointer field of a record being queried has a non-zero value, the database will halt processing of the query and launch a request back to the querying system 106 to send the query to the selected database indicated by the pointer field. The pointer field therefore performs the dual function of indicating that the record is being updated and identifying the database which is the selected database. It will be appreciated by those skilled in the art that any appropriate predetermined value may be used to indicate that the record is not being updated.

For illustrative purposes only, it is presumed for the following discussion that the provisioning system 104 has selected the database 101 as the selected database with the databases 102, 103 corresponding to the non-selected databases. In the first phase of provisioning for updating at least one record in each of the plurality of replicated databases 101–103, the provisioning system processor 110 is programmed to cause the provisioning system 104 to transmit update data and pointer data in the form of a transaction to each of the non-selected databases 102, 103. The transaction instructs the non-selected databases 102, 103 which record to update with the update data. The pointer data corresponds to the selected database 101. The non-selected databases 102, 103 receive the update data and pointer data as part of the transmission. The transmitted update data is stored or held in the memory queue in each of the non-selected databases 102, 103 while the pointer data is written in the pointer field in the record being updated. It will be appreciated by those skilled in the art that the transaction may be structured to update a plurality of records at one time such that the transaction will include a plurality of update data and a plurality of pointer data for the records being updated.

Each of the non-selected databases 102, 103 transmits a ready-to-commit acknowledgment signal to the provisioning system 104. The ready-to-commit acknowledgment signal indicates that the transaction was received, the update data was placed in the memory queue and the pointer data was written in the pointer field of the record being updated. If a query from the database querying system 106 is processed by one of the non-selected databases 102, 103 before the pointer field is updated with the pointer data, the query is processed by the queried database using the "old" data. If a query from the database querying system 106 is processed by one of the non-selected databases 102, 103 after the ready-to-commit acknowledgment signal was transmitted to provisioning system 104, the query is re-directed. As the ready-to-commit acknowledgment signal indicates that the pointer field in the record has been updated with the pointer data, the queried database will transmit a selected database requery signal to the database querying system 106. The selected database requery signal instructs the querying system 106 that the record queried is being updated and the query should be directed to the selected database 101 as specified by the pointer data. The querying system 106 will then query the selected database 101 and the query will be processed using the "old" data. All database queries to the record being updated are thus processed consistently with the "old" data. Accordingly, database synchronicity is assured during the first phase of provisioning.

If the provisioning system 104 does not receive the ready-to-commit acknowledgment signal from all of the non-selected databases 102, 103 in a first predetermined period of time, the provisioning system 104 will transmit a rollback signal to all of the non-selected databases 102, 103 instructing them to delete the update data from the memory queue and to reset the pointer field to zero (0) for the associated record. It should be apparent that the update data is held in each respective memory queue in each of the non-selected databases 102, 103 so that the "old" data in the record is not corrupted and can be recovered via the rollback as necessary. Network atomicity is therefore assured during the first phase of provisioning.

Once the provisioning system 104, and hence, the provisioning system processor 110, receives a ready-to-commit acknowledgment signal from each of the non-selected databases, the provisioning system processor 110 instructs the provisioning system 104 to transmit the transaction comprising the update data to the selected database 101 in the second phase of provisioning. The selected database 101 then updates the record with the update data. The pointer field in the record being updated remains set at zero because, as the selected database, there is no need to reroute any data queries sent to the selected database. Accordingly, the transaction sent to the selected database does not have to include pointer data. Alternatively, pointer data having a value of zero may be included with the transaction if desired.

The selected database 101 transmits a commit acknowledgment signal to the provisioning system 104 indicating that the record has been updated. Since the record being updated in the selected database 101 has its pointer field set to zero, the selected database 101 will process any data queries it receives and not instruct the querying database 106 to redirect the query. If a query from the database querying system 106 is processed by the selected database 101 before the update data is committed, the query will be processed using the "old" data. If a query from the database querying system 106 is processed by the selected database 101 after the update data is committed, the query will be processed using the update data. Further, since all of the non-selected databases 102, 103 point to the selected database 101, any queries to the non-selected databases 102, 103 for the record currently being updated will be redirected to the selected database 101 by the querying system 106 in response to the selected database requery signal from the queried non-selected database. Since all queries for a record that is in the middle of an update are being processed by a single database, i.e., the selected database, the queries are processed consistently. Thus, transaction atomicity and data synchronicity are assured during the second phase of processing.

If the provisioning system 104 does not receive the commit acknowledgment signal from the selected database 101 in a second predetermined period of time, the provisioning system 104 will transmit the rollback signal to all of the non-selected databases 102, 103 instructing them to delete the update data from the memory queue and to reset the pointer field to zero (0) for the associated record. Network atomicity is therefore further assured in the second phase of provisioning.

Once the provisioning system 104, and hence, the provisioning system processor 110, receives the commit acknowledgment signal from the selected database 101, the provisioning system processor 110 instructs the provisioning system 104 to transmit a "commit" transaction to the non-selected databases 102, 103 in a third phase of provisioning. The "commit" transaction instructs the non-selected databases 102, 103 to update the data for each record and clear, i.e., set, the associated record's pointer field to zero. If a query from the database querying system 106 is processed by the one of the non-selected databases 102, 103 before the "commit" transaction is processed, the queried database will transmit the selected database requery signal to the database querying system 106 to redirect the query to the selected database 101 since the pointer field has not been cleared. If a query from the database querying system 106 is processed by one of the non-selected databases 102, 103 after the "commit" transaction is processed, such that the pointer field has been cleared and the record updated with the update data, the query is processed normally using the update data. Transaction atomicity and data synchronicity is therefore assured during the third phase of provisioning, and thus, during the entire process. The principle area of disaster avoidance is maintained because the same transaction is never transmitted to all of the databases simultaneously.

Having described the invention in detail and by reference to preferred embodiments thereof, it will be apparent that modifications and variations are possible without departing from the scope of the invention defined in the appended claims.

What is claimed is:

1. A method for updating at least one record in each of a plurality of replicated databases, said method comprising the steps of:
   selecting one of said plurality of databases as a selected database with the remaining databases being non-selected databases;
   transmitting to each of said non-selected databases update data for updating said at least one record and pointer data identifying said selected database;
   redirecting queries regarding said at least one record made to said non-selected databases to said selected database in accordance with said pointer data;
   transmitting to said selected database said update data for updating said at least one record in said selected database;
   updating said at least one record in said selected database with said update data;
   instructing said non-selected databases to update said at least one record with said update data; and
   instructing said non-selected databases to clear said pointer data so that queries regarding said at least one record are once again handled by said non-selected databases.

2. The method of claim 1, further comprising the step of receiving a ready-to-commit acknowledgment from each of said non-selected databases indicating receipt of said update data and said pointer data prior to said step of transmitting to said selected database said update data for updating said at least one record.

3. The method of claim 1, wherein said step of transmitting to each of said non-selected databases update data for updating said at least one record and pointer data identifying said selected database comprises the step of holding said update data in a queue.

4. The method of claim 3, wherein said queue forms a portion of each of said non-selected databases.

5. The method of claim 1, wherein said step of transmitting to each of said non-selected databases update data for updating said record and pointer data identifying said selected database comprises the step of updating a pointer field in each of said plurality of non-selected databases with said pointer data.

6. The method of claim 1, wherein said step of transmitting to said selected database said update data for updating said at least one record in said selected database further comprises the step of updating a pointer field in said selected database indicating that the database has been selected.

7. The method of claim 1, further comprising the step of receiving a commit response from said selected database indicating that said at least one record has been updated prior to said step of instructing said non-selected databases to update said at least one record with said update data.

8. The method of claim 1, wherein said method is performed for a plurality of records.

9. A method for updating at least one record in each of a plurality of replicated databases, said method comprising the steps of:
   selecting one of said plurality of databases as a selected database with the remaining databases being non-selected databases;
   transmitting to each of said non-selected databases update data for updating said at least one record and pointer data identifying said selected database;
   holding said update data in a queue in each of said non-selected databases;
   updating a pointer field in said at least one record in each of said plurality of non-selected databases with said pointer data, each of said non-selected databases generating a ready-to-commit acknowledgment indicating receipt of said update data and said pointer data;
   if said ready-to-commit acknowledgment is not generated by each of said non-selected databases within a first predetermined amount of time, then:
      instructing each of said non-selected databases to delete said update data from each respective queue; and
      instructing each of said non-selected databases to clear said pointer data from each respective pointer field;
   otherwise:
      transmitting to said selected database said update data for updating said at least one record;
      updating said at least one record in said selected database with said update data and a pointer field in said selected database indicating that said selected database is the selected database, said selected database generating a commit acknowledgment indicating that said at least one record has been updated;
      if said commit acknowledgment is not generated by said selected database within a second predetermined time, then:
         instructing each of said non-selected databases to delete said update data from each respective queue; and
         instructing each of said non-selected databases to clear said pointer data from each respective pointer field; otherwise:
            instructing each of said non-selected databases to update said at least one record with said update data; and
            instructing said non-selected databases to clear said pointer data.

10. A database system comprising;
   a plurality of replicated databases, each of said plurality of replicated databases comprising a plurality of records; and
   a database provisioning system having a provisioning system processor configured to control said plurality of replicated databases so as to update at least one record of said plurality of records in each of said plurality of replicated databases, as necessary, said provisioning system processor being programmed to:
      select one of said plurality of replicated databases as a selected database with the remaining databases being non-selected databases;
      transmit to each of said non-selected databases update data for updating said at least one record and pointer data identifying said selected database;

redirect queries regarding said at least one record made to said non-selected databases to said selected database in accordance with said pointer data;

transmit to said selected database said update data for updating said at least one record in said selected database, said at least one record in said selected database being updated with said update data;

instruct said non-selected databases to update said at least one record with said update data; and instruct said non-selected databases to clear said pointer data so that queries regarding said at least one record are once again handled by said non-selected databases.

11. The system of claim 10, wherein said provisioning system processor is programmed to receive a ready-to-commit acknowledgment from each of said non-selected databases indicating receipt of said update data and said pointer data prior to said provisioning system processor transmitting to said selected database said update data for updating said at least one record in said selected database.

12. The system of claim 10, wherein each of said plurality of non-selected databases comprises a memory queue for storing said update data for updating said at least one record.

13. The system of claim 10, wherein each of said plurality of records in each of said plurality of replicated databases includes a pointer field, said processor being programmed to cause each of said non-selected databases to write said pointer data into each respective pointer field.

14. The system of claim 10, wherein each of said of plurality of records in each of said plurality of replicated databases includes a pointer field, said processor being programmed to cause said selected database to indicate in said pointer field of said at least one record being updated that the database has been selected.

15. The system of claim 14, wherein said pointer field of said at least one record being updated in said selected database is set to a predetermined value which indicates that the database has been selected.

16. The system of claim 15, wherein said predetermined value is zero.

17. The system of claim 10, wherein said provisioning system processor is further programmed to receive a commit response from said selected database indicating that said at least one record has been updated prior to said provisioning system processor instructing said non-selected databases to update said at least one record with said update data.

18. A database system comprising:

a plurality of replicated databases, each of said plurality of replicated databases comprising a memory queue and a plurality of records each including a pointer field; and a database provisioning system having a provisioning system processor configured to control said plurality of replicated databases so as to update at least one record of said plurality of records in each of said plurality of replicated databases, as necessary, said provisioning system processor being programmed to:

select one of said plurality of replicated databases as a selected database with the remaining databases being non-selected databases;

transmit to each of said non-selected databases update data for updating said at least one record and pointer data identifying said selected database, said update data being stored in said memory queue in each of said non-selected databases and said pointer field in said at least one record in each of said non-selected databases being updated with said pointer data;

redirect queries regarding said at least one record made to said non-selected databases to said selected database in accordance with said pointer data;

transmit to said selected database said update data to update said at least one record in said selected database with said update data once a ready-to-commit acknowledgment signal is received from each of said non-selected databases in a first predetermined amount of time indicating receipt of said update data and said pointer data, if said ready-to-commit acknowledgment signal is not received from each of said non-selected databases within said first predetermined period of time, then said provisioning system processor is programmed to:

instruct each of said non-selected databases to delete said update data from each respective memory queue; and instruct each of said non-selected databases to clear said pointer data from each respective pointer field so that queries regarding said at least one record are once again handled by said non-selected databases; otherwise, said provisioning system processor is programmed to:

instruct said non-selected databases to update each respective said at least one record with said update data and to clear said pointer data from each respective pointer field so that queries regarding said at least one record are once again handled by said non-selected databases once a commit acknowledgment signal is received from said selected database in a second predetermined period of time indicating that said at least one record has been updated in said selected database, if said commit acknowledgment signal is not received from said selected database within said second predetermined period of time, then said provisioning system processor is programmed to:

instruct each of said non-selected databases to delete said update data from each respective memory queue; and instruct each of said non-selected databases to clear said pointer data from each respective pointer field so that queries regarding said at least one record are once again handled by said non-selected databases.

* * * * *

UNITED STATES PATENT AND TRADEMARK OFFICE
CERTIFICATE OF CORRECTION

PATENT NO. : 6,243,715 B1
DATED : June 5, 2001
INVENTOR(S) : Robert L. Bogantz, Sidney D. Hester and William W. Kean It is certified that error appears in the above-identified patent and that said Letters Patent is hereby corrected as shown below:

Column 2,
Line 64, "herein" should read -- wherein --.

Column 10,
Line 18, "said plurality of non-selected" should read -- said non-selected --.
After line 21, insert -- redirecting queries regarding said at least one record made to said non-selected databases to said selected database in accordance with said pointer data; --
Line 34, "that said selected" should read -- that the --
Line 35, "is the selected database," should read -- has been selected, --
Line 46, "field; otherwise:" should read -- field so that queries regarding said at least one record are once again handled by said non-selected databases; otherwise: --
Line 51, "pointer data." should read -- pointer data so that queries regarding said at least one record are once again handled by said non-selected databases. --
Line 52, "comprising;" should read -- comprising: --

Signed and Sealed this

Sixteenth Day of July, 2002

*Attest:*

JAMES E. ROGAN
*Attesting Officer*     *Director of the United States Patent and Trademark Office*